US012233938B2

(12) United States Patent
Nagasawa

(10) Patent No.: US 12,233,938 B2
(45) Date of Patent: Feb. 25, 2025

(54) FRONT FRAME STRUCTURE FOR ELECTRIC VEHICLE

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/429,953

(22) Filed: Feb. 1, 2024

(65) Prior Publication Data

US 2024/0278838 A1 Aug. 22, 2024

(30) Foreign Application Priority Data

Feb. 21, 2023 (JP) ................................ 2023-025423

(51) Int. Cl.
*B62D 21/15* (2006.01)
*B60K 1/00* (2006.01)
*B60R 19/24* (2006.01)

(52) U.S. Cl.
CPC .............. *B62D 21/152* (2013.01); *B60K 1/00* (2013.01); *B60R 19/24* (2013.01)

(58) Field of Classification Search
CPC .......... B62D 21/152; B60K 1/00; B60R 19/24
See application file for complete search history.

(56) References Cited

U.S. PATENT DOCUMENTS

| 3,794,348 | A | * | 2/1974 | Fischer | B62D 21/152 |
|---|---|---|---|---|---|
| | | | | | 188/371 |
| 4,431,221 | A | * | 2/1984 | Jahnle | B62D 21/152 |
| | | | | | 293/122 |
| 2003/0230443 | A1 | * | 12/2003 | Cramer | B62D 21/152 |
| | | | | | 180/65.51 |
| 2005/0077711 | A1 | * | 4/2005 | Yasui | B62D 25/04 |
| | | | | | 296/193.09 |
| 2010/0264637 | A1 | * | 10/2010 | Kosaka | B62D 21/152 |
| | | | | | 280/784 |
| 2013/0249248 | A1 | * | 9/2013 | Ohnaka | B62D 25/08 |
| | | | | | 296/203.02 |

(Continued)

FOREIGN PATENT DOCUMENTS

EP           0655565 A1 *  5/1995  ............. B62D 21/15
JP     2012-201284 A     10/2012

*Primary Examiner* — Frank B Vanaman
(74) *Attorney, Agent, or Firm* — Smith, Gambrell & Russell, LLP

(57) ABSTRACT

In a front frame structure for an electric vehicle, front side frames disposed in extra spaces between side walls of a motor room and side surfaces of a power control unit include a wall-shaped portion in a rear region and an arm-shaped portion in a front portion. A first inclined surface portion is formed in a lower portion of the wall-shaped portion to extend forward from a rear portion. A second inclined surface portion is formed on a bottom surface of the arm-shaped portion to extend forward from an end of the first inclined surface portion. Lower side frames of the lower frame and the front side frames are joined while being reinforced via front reinforcements. Side surfaces of an upper valley line portion joining the inclined surface portions and side surfaces of the lower side frame facing a lower side of the line portion are coupled via rear reinforcements.

8 Claims, 5 Drawing Sheets

(56) References Cited

U.S. PATENT DOCUMENTS

2016/0039373 A1* 2/2016 Yamada .................. B60R 19/34
                                                    293/132
2019/0118863 A1* 4/2019 Hara ....................... B62D 25/20
2021/0253172 A1* 8/2021 Shimoda .............. B62D 21/152

* cited by examiner

FRONT FRAME STRUCTURE FOR ELECTRIC VEHICLE

CROSS-REFERENCE TO RELATED APPLICATIONS

The present application claims priority from Japanese Patent Application No. 2023-025423 filed on Feb. 21, 2023, the entire contents of which are hereby incorporated by reference.

BACKGROUND

The disclosure relates to a front frame structure for an electric vehicle.

A power unit including an electric motor is mounted in a motor room provided in a front portion of an electric vehicle. In an event of a full-wrap frontal collision or a small-overlap frontal collision, it is almost impossible for the power unit to absorb impact energy because the power unit is a rigid body. Since the power unit of the electric vehicle is smaller in size than a power unit of a reciprocating engine, a control unit including high-voltage members such as an inverter and a direct current-direct current (DC/DC) converter is often mounted above the power unit.

If the power unit, which is a rigid body, is retreated by an impact in an event of a frontal collision, a cabin may be deformed. The control unit, which is a high-voltage member, may be crushed by the impact in the event of the frontal collision. Thus, in the event of the frontal collision, the impact energy in the event of the frontal collision is to be absorbed at least in front of the power control unit in which the power unit and the control unit are integrated.

The electric vehicle uses a large-capacity battery to ensure a sufficient cruising distance. In many cases, an entire space under a floor is ensured as a battery chamber, and a battery is accommodated in the battery chamber. Thus, in an event of a frontal collision, deformation of the cabin and the battery chamber is to be reduced for effective protection.

For example, Japanese Unexamined Patent Application Publication (JP-A) No. 2012-201284 discloses an electric vehicle in which one main frame extending in a front-rear direction of a vehicle body is disposed at the center in a vehicle width direction of the vehicle body, and a battery is accommodated in the main frame. In the electric vehicle disclosed in JP-A No. 2012-201284, the battery is not accommodated in a portion of the main frame extending forward with respect to front wheels, and impact energy is absorbed by the portion extending forward with respect to the front wheels in an event of a frontal collision.

SUMMARY

An aspect of the disclosure provides a front frame structure for an electric vehicle. The front frame structure includes front side frames in a pair, a bumper beam, and a lower frame. The front side frames extend in a front-rear direction of a vehicle body of the electric vehicle and are disposed on both sides in a vehicle width direction of a motor room provided in a front portion of the vehicle body. The bumper beam couples respective front ends of the front side frames. The lower frame is disposed in a lower portion of the motor room. Both sides in the vehicle width direction of the lower frame are supported by the front side frames respectively. The power control unit includes an electric motor and is supported on a rear portion of the lower frame. The front side frames are disposed respectively in extra spaces that are each defined with a side wall in the vehicle width direction of the motor room and a side surface of the power control unit. The front side frames each include a wall-shaped portion and an arm-shaped portion. The wall-shaped portion has a wall shape with a dimension in a height direction from a bottom portion of the motor room to an upper portion of the motor room, and extends rearward of the motor room in a rear region of the motor room. The arm-shaped portion extends from a front end portion of the wall-shaped portion toward a front portion of the motor room. A first inclined surface portion having a predetermined elevation angle is formed in a lower portion of the wall-shaped portion to extend forward from a rear portion of the wall-shaped portion. A second inclined surface portion having a predetermined depression angle is formed on a bottom surface of the arm-shaped portion to extend forward from an end portion of the first inclined surface portion. Lower side frames provided respectively on a left and a right of the lower frame are joined to lower portions of the front side frames. A front end portion of each of the front side frames and a front end portions of a corresponding one of the lower side frames are joined while being reinforced via front reinforcements. A side surface of an upper valley line portion where the first inclined surface portion and the second inclined surface portion are joined to each other and a side surface of the corresponding one of the lower side frames facing a lower side of the upper valley line portion are coupled to each other via a rear reinforcement.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

The electric vehicle disclosed in JP-A No. 2012-201284 is originally designed as a dedicated frame structure. Thus, cost may increase as compared with a frame structure for an electric vehicle designed based on a front frame structure that is used for a vehicle in which a conventional reciprocating engine is mounted.

When impact energy in an event of a frontal collision is to be absorbed by a front end portion of the main frame, a crush stroke (an expected amount of plastic deformation in a collision direction in the event of the frontal collision) of the main frame is set to be forward with respect to a power unit. However, when the crush stroke is to be ensured by the deformation of the main frame, a front overhang amount to the front with respect to the power unit increases, and design may be impaired.

It is desirable to provide a front frame structure for an electric vehicle. The front frame structure can be designed based on a front frame structure that is used for a vehicle in which a conventional reciprocating engine is mounted, and can effectively protect a power control unit, and a cabin or a battery chamber from an impact load in an event of a frontal collision without impairing design.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
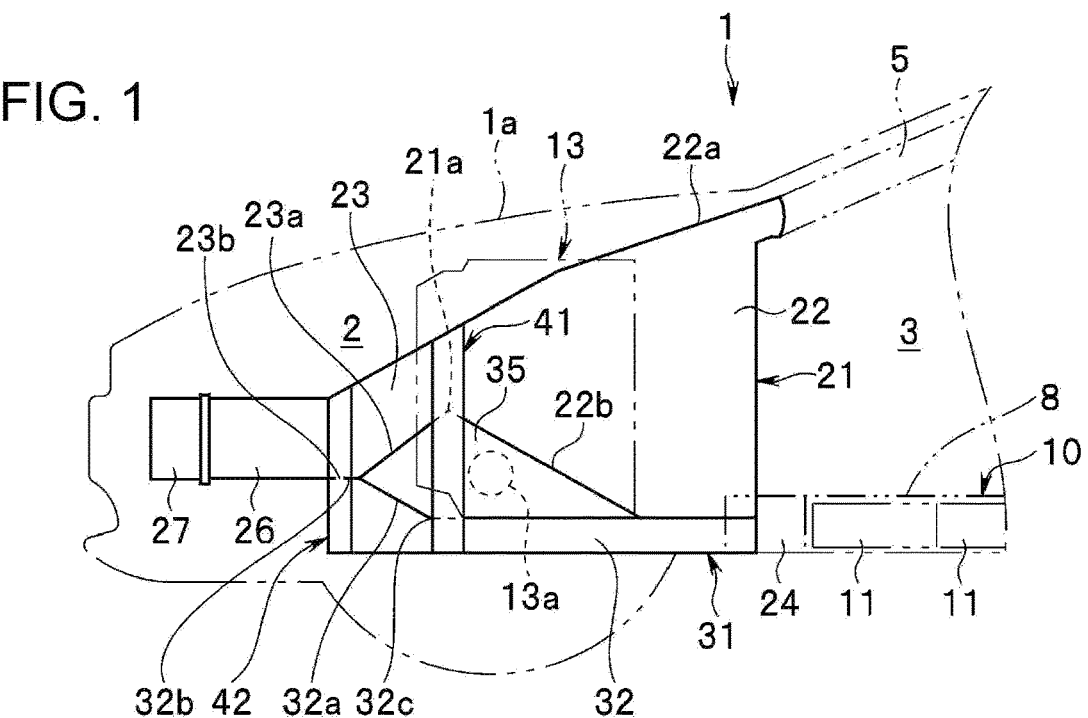
FIG. 1 is a side view illustrating a front frame structure.
Figure 2:
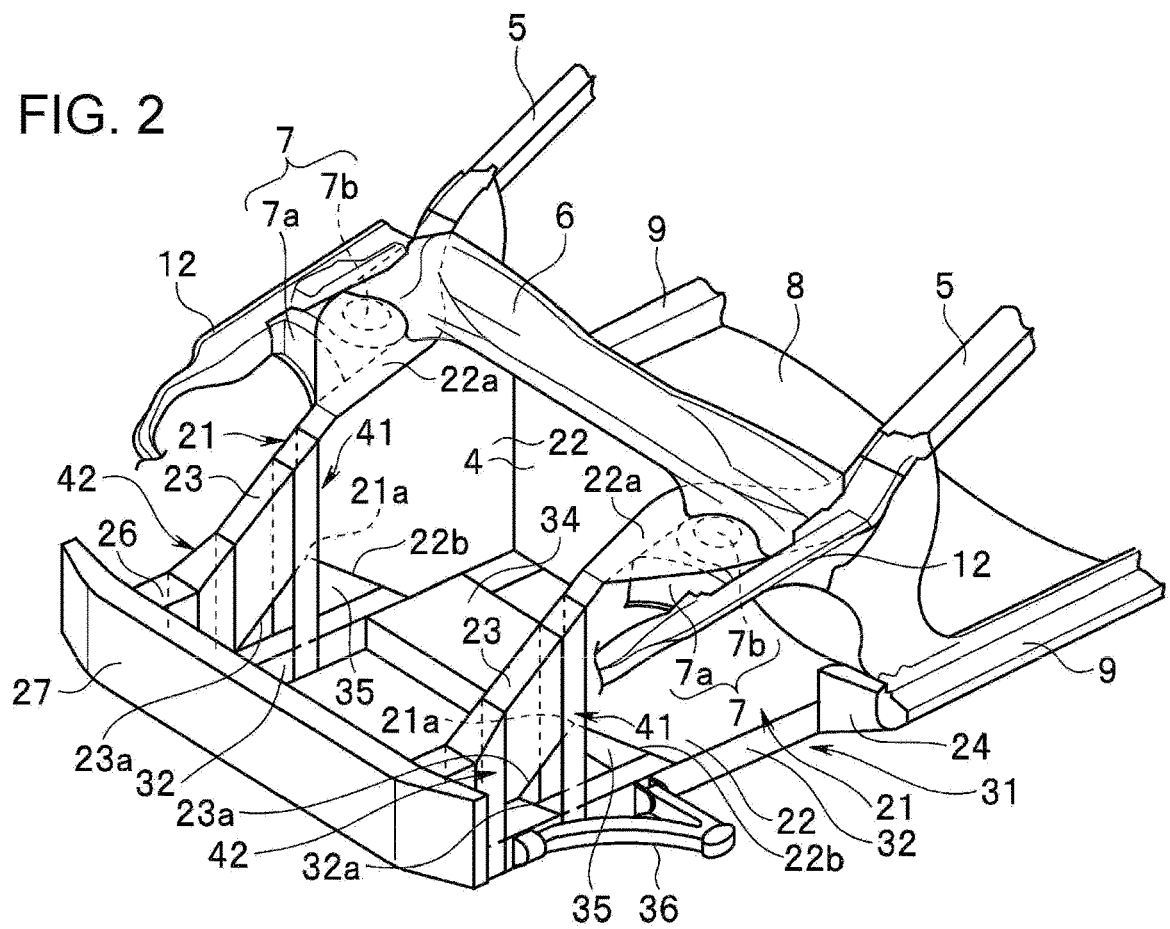
FIG. 2 is a perspective view illustrating the front frame structure.

FIGS. 1 and 2 illustrate a frame structure of a vehicle body front portion 1 in an electric vehicle according to the embodiment. A motor room 2 is provided in the vehicle body front portion 1. An upper opening of the motor room 2 is covered with a front hood 1a that can be opened and closed.

A cabin 3 is provided in rear of the motor room 2. The motor room 2 and the cabin 3 are partitioned via a toe board 4 extending in a vehicle width direction. In the following description, when a term "weld-join" is used, the joining method is performed by welding using a welding method typified by spot welding unless otherwise specified.

Both left and right side edges of the toe board 4 are weld-joined to a pair of opposite front pillars 5. An upper end edge of the toe board 4 is weld-joined to a bulkhead 6 extending in the vehicle width direction. A pair of wheel aprons 7 opposite to each other are formed at front portions on both sides of the toe board 4. A lower portion of the toe board 4 is continuous with a front end edge of a floor panel 8. The floor panel 8 corresponds to a floor surface of the cabin 3.

Both sides in the vehicle width direction of the floor panel 8 are weld-joined to a pair of side sills 9. The side sills 9 extend in a front-rear direction of the vehicle body on left and right side portions of the floor panel 8. Front portions of the side sills 9 are weld-joined to lower end portions of the front pillars 5. Upper portions of the left and right front pillars 5 extend upward of the vehicle body in a state of being inclined rearward, and are weld-joined to front end portions of roof side rails (not illustrated).

A battery chamber 10 is provided substantially entirely under a lower surface of the floor panel 8. The battery chamber 10 is a sealed container. Multiple battery modules 11 are disposed in the battery chamber 10. Each of the battery modules 11 stores electric energy for driving a traveling electric motor.

The pair of wheel aprons 7 opposite to each other form side walls of the motor room 2. Each of the wheel aprons 7 is provided with an arch-shaped wheel house 7a that covers an upper side of a front wheel (not illustrated), a suspension tower 7b that supports an upper portion of a strut of a suspension (not illustrated) that suspends the front wheel, and the like. The suspension tower 7b is disposed at a relatively rear portion of the motor room 2, and protrudes inward in the vehicle width direction of the motor room 2.

An upper end portion of the wheel apron 7 is weld-joined to an upper side frame 12. A rear end of the upper side frame 12 is weld-joined to the front pillar 5. An outer side in the vehicle width direction of the suspension tower 7b is weld-joined to the upper side frame 12. The left and right front pillars 5 are weld-joined to both end portions of the bulkhead 6. Both the end portions of the bulkhead 6 are weld-joined to the left and right wheel aprons 7. The suspension tower 7b may be a strut tower.

A front frame structure of an electric vehicle is designed based on a front frame structure of a vehicle in which a conventional reciprocating engine is mounted. A power control unit including an electric motor and a transmission is smaller in size than a power unit of a reciprocating engine. Thus, many electric vehicles adopt a structure in which a control unit including high-voltage members such as an inverter and a DC/DC converter is mounted above a power unit.

Thus, in the electric vehicles, a proportion of a volume (volume occupancy) of a power control unit 13 in which the power unit and the control unit are integrated in the motor room 2 is lower than a volume occupancy of a power unit using a reciprocating engine as a driving source in an engine room having the same volume as the motor room 2. As a result, in the motor room 2, extra spaces are formed between left and right side walls of the motor room 2 and side surfaces of the power control unit 13 facing the left and right side walls.

In the present embodiment, a framework of the front frame structure is reconstructed by utilizing the extra spaces generated in the motor room 2. Thus, impact energy in an event of a full-wrap frontal collision or a small-overlap frontal collision can be efficiently absorbed in front of the power control unit 13.

First, front side frames 21 are reconstructed. The reconstructed front side frames 21 are disposed in the extra spaces formed between side surfaces in the vehicle width direction of the power control unit 13 and inner surfaces in the vehicle width direction of the wheel aprons 7 in the motor room 2. The front side frames 21 extend in the front-rear direction of the vehicle body.

Rear portions of the front side frames 21 are weld-joined to end portions in the vehicle width direction of a toe board cross member (not illustrated) that reinforces the toe board 4. Front ends of the front side frames 21 are weld-joined to crash boxes 26. The crash boxes 26 are provided at the positions of the center of gravity in an up-down direction of the electric vehicle. The front side frames 21, the crash boxes 26, and lower side frames 32 provided in a cradle 31 (described later) have the same width in a front view.

Each of the front side frames 21 in the motor room 2 has a wall-shaped portion 22 formed in the rear portion thereof and an arm-shaped portion 23 formed in a front portion thereof. The wall-shaped portion 22 and the arm-shaped portion 23 each are formed in a hollow rectangular shape in cross section. The wall-shaped portion 22 constitutes a rear region of the front side frame 21. The arm-shaped portion 23 constitutes a front region of the front side frame 21.

The wall-shaped portion 22 has, for example, a dimension in a height direction from a bottom portion to an upper portion of the motor room 2. For example, the wall-shaped portion 22 has a dimension from the bottom portion of the motor room 2 to a height substantially the same as the height of the upper side frame 12 in the height direction of the vehicle body. A rear end of the wall-shaped portion 22 is weld-joined to the end portion of the toe board cross member (not illustrated) of the toe board 4. An outer side in the vehicle width direction of a rear portion of the wall-shaped portion 22 is weld-joined to a torque box 24. The torque box 24 is weld-joined to an inner surface in the vehicle width direction of a front portion of the side sill 9.

The wall-shaped portion 22 extends from the vicinity of the center of the motor room 2 to the toe board 4 in the front-rear direction of the vehicle body. An upper panel 22a is formed on an upper surface of the wall-shaped portion 22. The width of the upper panel 22a is gradually increased outward in the vehicle width direction from a front end toward the rear portion of the wall-shaped portion 22. The upper panel 22a is weld-joined to an upper surface of the suspension tower 7b. A rear portion of the upper panel 22a is weld-joined to the bulkhead 6. A rear end of the upper panel 22a is weld-joined to the front pillar 5. Since the upper panel 22a is weld-joined to the upper surface of the suspension tower 7b, the rigidity of the suspension tower 7b is increased.

A first inclined surface portion 22b inclined forward at a predetermined elevation angle is formed in a lower portion of each of the left and right front side frames 21 and in a front portion of the wall-shaped portion 22. In contrast, a second inclined surface portion 23a inclined forward at a predetermined depression angle from a rear portion of the arm-shaped portion 23 is formed in the lower portion of each of the left and right front side frames 21 continuously with an upper end of the first inclined surface portion 22b. The arm-shaped portion 23 has a flat surface 23b formed from a lower end of the second inclined surface portion 23a toward a distal end of the arm-shaped portion 23. Each of the left and right front side frames 21 has a substantially triangular space having an apex at an upper valley line portion 21a of both the first and second inclined surface portions 22b and 23a.

The crash boxes 26 are coupled to distal ends of the left and right front side frames 21. Distal ends of the left and right crash boxes 26 are coupled to each other via a bumper beam 27 extending in the vehicle width direction.

Figure 3:
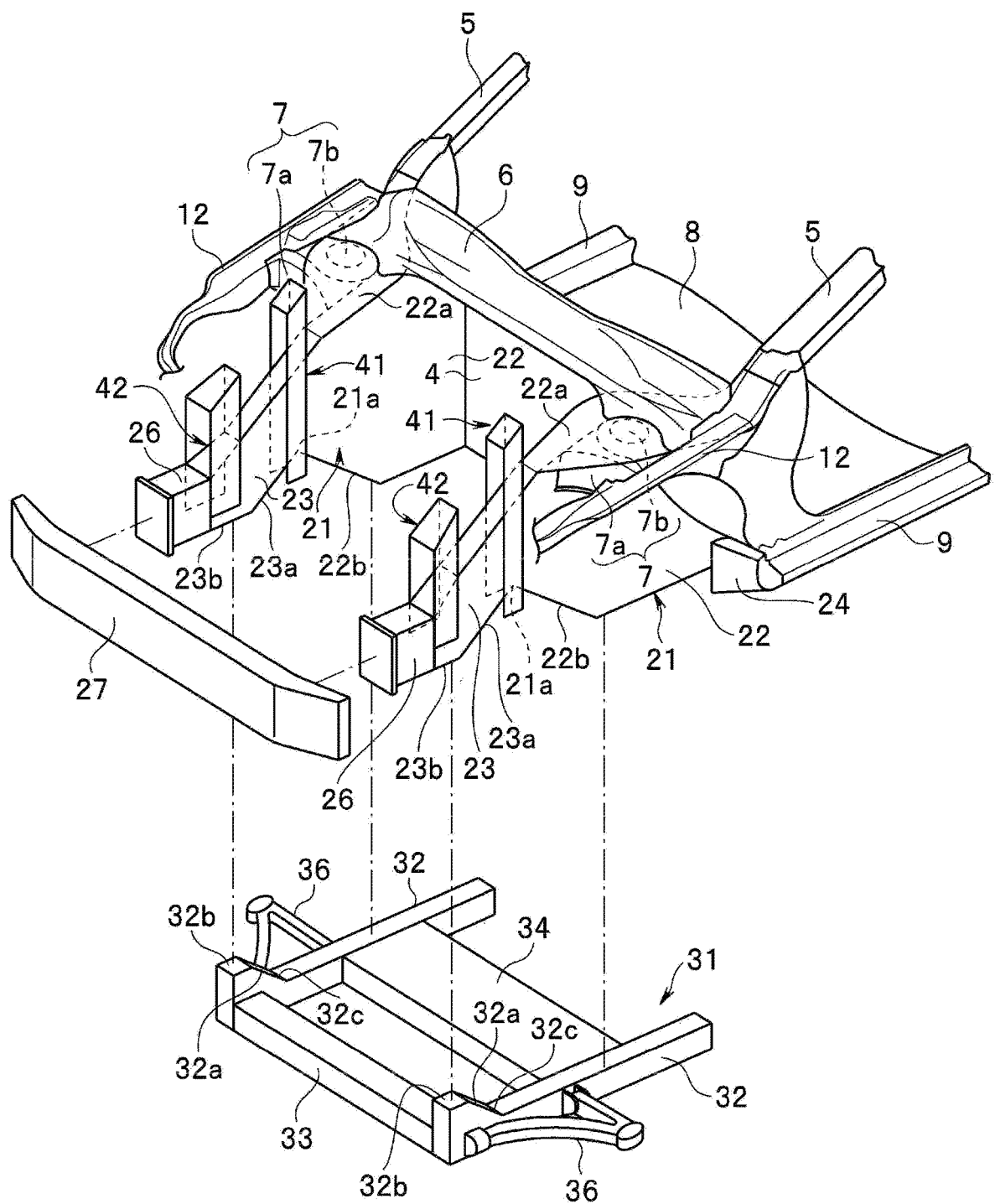
FIG. 3 is an exploded perspective view illustrating the front frame structure.

In contrast, a cradle 31 serving as a lower frame is disposed on a bottom surface of the motor room 2. As illustrated in FIG. 3, the cradle 31 includes a pair of left and right lower side frames 32, a front cross member 33, and a rear cross member 34. The lower side frames 32 and the front and rear cross members 33 and 34 each are formed in a hollow rectangular shape in cross section.

Both ends of the front cross member 33 are weld-joined to front end portions of the left and right lower side frames 32 on inner sides in the vehicle width direction. Both ends of the rear cross member 34 are weld-joined to rear portions of the left and right lower side frames 32 on inner sides in the vehicle width direction. The distance between the left and right lower side frames 32 is set and held to be the same as the distance between the left and right front side frames 21 by both the front and rear cross members 33 and 34.

The rear cross member 34 is formed to be slightly wide in the front-rear direction. The power control unit 13 is supported on the rear cross member 34 via a motor mount (not illustrated). An axle shaft 13a extends from the transmission provided in the power control unit 13 to both sides in the vehicle width direction.

The width in the vehicle width direction of each of the lower side frames 32 is the same as the width in the vehicle width direction of the front side frame 21. A third inclined surface portion 32a inclined at a predetermined elevation angle from the rear to the front of the vehicle body is formed on a distal end side of the lower side frame 32. A flat surface 32b is formed on each of the left and right lower side frames 32 from an upper end of the third inclined surface portion 32a toward a distal end of the lower side frame 32.

The flat surface 23b of the arm-shaped portion 23 and the flat surface 32b of the cradle 31 are coupled to each other via a fastening member such as a bolt. In a state in which both the flat surfaces 23b and 32b are coupled to each other, distal end surfaces of the front side frame 21 and the lower side frame 32 are flush with each other.

Upper surfaces on rear end sides of the left and right lower side frames 32 are coupled to bottom surfaces of the wall-shaped portions 22 via fastening members such as bolts. Rear end portions of the left and right lower side frames 32 on the outer sides in the vehicle width direction are coupled to the torque boxes 24 via fastening members such as bolts. Rear ends of the left and right lower side frames 32 are coupled to a floor cross member (not illustrated). The floor cross member is weld-joined to the toe board 4.

As illustrated in FIG. 1, in a state in which the left and right lower side frames 32 provided in the cradle 31 are coupled to bottom surfaces of the left and right front side frames 21, a rhombus-shaped space 35 is formed by both the first and second inclined surface portions 22b and 23a of each of the front side frames 21, corresponding one of the left and right lower side frames 32, and the third inclined surface portion 32a on the distal end side of the lower side frame 32.

A lower valley line portion 32c formed in a rising portion of the third inclined surface portion 32a of the lower side frame 32 is set at a position slightly forward with respect to the upper valley line portion 21a of both the first and second inclined surface portions 22b and 23a formed in the front side frame 21.

As illustrated in FIG. 1, a region corresponding to a crush stroke is set between a front portion of the power control unit 13 and a distal end portion of the front side frame 21. The axle shaft 13a extending from the power control unit 13 to both sides in the vehicle width direction passes through the space 35 and protrudes outward in the vehicle width direction. A suspension arm (lower arm) 36 is supported on the outer side in the vehicle width direction of the lower side frame 32 in a state swingable in the up-down direction. The suspension arm 36 cooperates with an upper arm (not illustrated) to suspend the front wheel connected to the axle shaft 13a.

Figure 4:
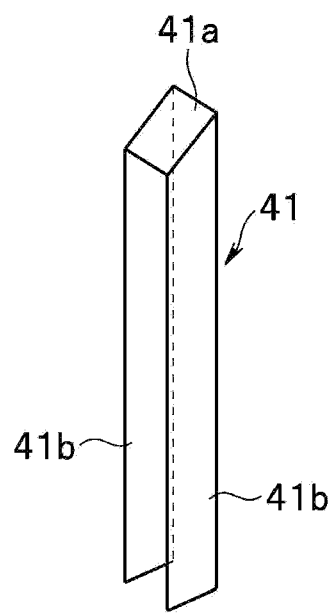
FIG. 4 is a perspective view of a rear reinforcement.

A rear reinforcement 41 having a predetermined width is weld-joined to a portion of the front side frame 21 where the upper valley line portion 21a is located. The rear reinforcement 41 is a plate member formed by bending into a groove shape. As illustrated in FIG. 4, the rear reinforcement 41 has an upper surface 41a and side surface portions 41b extending downward from both sides of the upper surface 41a. The upper surface 41a of the rear reinforcement 41 is weld-joined to an upper surface of the front side frame 21 located at the upper valley line portion 21a. The side surface portions 41b of the rear reinforcement 41 are weld-joined to both side surfaces of the front side frame 21 located at the upper valley line portion 21a. In FIG. 4, the rear reinforcement 41 is illustrated with the plate thickness thereof omitted.

Lower end portions of both the side surface portions 41b of the rear reinforcement 41 are weld-joined to both side surfaces of the lower side frame 32. The front side frame 21 and the lower side frame 32 are connected with the space 35 interposed therebetween by the rear reinforcement 41.

In a side view illustrated in FIG. 1, the lower valley line portion 32c of the lower side frame 32 and front edges of both the side surface portions 41b of the rear reinforcement 41 are disposed at positions substantially coincide with each other.

As illustrated in FIG. 1, in a rear portion of the space 35, a rear truss structural body is formed by the rear reinforcement 41, the first inclined surface portion 22b, and the lower side frame 32. In a front portion of the space 35, a front truss structural body is formed by the side surface portions 41b of the rear reinforcement 41, the second inclined surface portion 23a, and the third inclined surface portion 32a of the lower side frame 32.

The heights in the up-down direction of the crash box 26, and the arm-shaped portion 23 and the wall-shaped portion 22 of the front side frame 21 are set to the crash box 26<the arm-shaped portion 23<the wall-shaped portion 22. The crash box 26, the front side frame 21, and the lower side frame 32 have the same width in a front view. Thus, the rigidities of the crash box 26, the front truss structural body, and the rear truss structural body are the crash box 26<the front truss structural body<the rear truss structural body. As described above, when the electric vehicle is involved in a full-wrap frontal collision, the crash box 26, the front truss structural body, and the rear truss structural body are axially crushed in this order.

Figure 5:
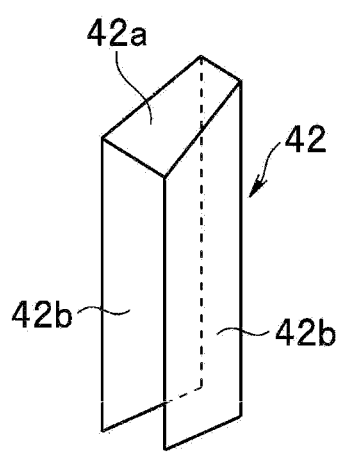
FIG. 5 is a perspective view of a front reinforcement.

A front reinforcement 42 having a predetermined width is weld-joined to distal end portions where the flat surfaces 23b and 32b formed on the front side frame 21 and the lower side frame 32 of the cradle 31 are coupled. The front reinforcement 42 is a plate member formed by bending into a groove shape. As illustrated in FIG. 5, the front reinforcement 42 has an upper surface 42a and side surface portions 42b extending downward from both sides of the upper surface 42a.

The upper surface 42a of the front reinforcement 42 is weld-joined to an upper surface side of a distal end portion of the front side frame 21. The side surface portions 42b of the front reinforcement 42 are weld-joined to both side surfaces of the distal end portion of the front side frame 21. In FIG. 5, the front reinforcement 42 is illustrated with the plate thickness thereof omitted.

Lower end portions of both the side surface portions 42b of the front reinforcement 42 are weld-joined to both side surfaces on a distal end portion side of the lower side frame 32.

The upper valley line portion 21a of the front side frame 21 is a portion in which an impact load in an event of a frontal collision of the vehicle is concentrated to give a trigger for axial crushing. Thus, when impact energy in the event of the frontal collision of the vehicle is to be absorbed by the axial crushing of the front side frame 21, deformation of the upper valley line portion 21a is to be correctly controlled. In contrast, when the upper valley line portion 21a of the front side frame 21 is deformed by receiving the impact load, the cradle 31 is to be deformed so as not to hinder the axial crushing of the front side frame 21. The lower valley line portion 32c formed in the lower side frame 32 of the cradle 31 is a portion to give a trigger for this deformation.

The rear reinforcement 41 is weld-joined to correctly control the axial crushing of the front side frame 21 in the event of the frontal collision of the vehicle. That is, the dimension in the height direction of the front side frame 21 increases from a rear end of the arm-shaped portion 23 to the wall-shaped portion 22 with the upper valley line portion 21a as the boundary. Thus, when the front side frame 21 receives the impact load in the event of the full-wrap frontal collision, the front side frame 21 tends to expand and deform in the vehicle width direction from the rear end of the arm-shaped portion 23 to the wall-shaped portion 22. When the front side frame 21 expands and deforms in the vehicle width direction, it is difficult to effectively absorb the impact energy.

Thus, by reinforcing the side surfaces and the upper surface of the front side frame 21 positioned at the upper valley line portion 21a with the rear reinforcement 41, the expansion in the vehicle width direction from the rear end of the arm-shaped portion 23 to the wall-shaped portion 22 is prevented. By appropriately setting the width and the plate thickness of the rear reinforcement 41, it is possible to correctly control the axial crushing.

By setting the lower valley line portion 32c immediately in front of the front edge of the rear reinforcement 41, the lower side frame 32 of the cradle 31 can be deformed to be buckled in a state not to hinder the axial crushing of the front side frame 21.

In contrast, when a coupling portion between the flat surface 23b of the front side frame 21 and the flat surface 32b of the lower side frame 32 is deformed in an initial stage in the event of the frontal collision, it is difficult to correctly transmit the impact load rearward. As a result, transmission of a stable load due to the axial crushing of the front side frame 21 is hindered.

Thus, by reinforcing the distal end portions where the flat surface 23b of the front side frame 21 and the flat surface 32b of the lower side frame 32 are coupled by the front reinforcement 42, deformation of the distal end portions in the initial stage of the collision is prevented. Reference sign E illustrated in FIGS. 6A to 6C denotes a three-dimensional obstacle such as a vehicle or an outer wall.

Next, a description will be given of an operation in an event of a frontal collision of an electric vehicle having such a front frame structure against the three-dimensional obstacle E.

In the front frame structure according to the present embodiment, the reconstructed front side frame 21 is disposed in each of the left and right extra spaces in the motor room 2, and the cradle 31 is coupled to a lower portion of the front side frame 21.

The upper valley line portion 21a is formed in an upper portion of the space 35 formed by the front side frame 21 and the cradle 31. The space 35 is formed in a rhombus shape, and the side surfaces of the front side frame 21 and the lower side frame 32 positioned at the upper and lower valley line portions 21a and 32c are reinforced by the rear reinforcement 41. The front truss structural body is formed in the front portion of the space 35 by the rear reinforcement 41, and the rear truss structural body is formed in the rear portion of the space 35 by the rear reinforcement 41. The coupling between the distal end portion of the front side frame 21 and the distal end portion of the lower side frame 32 is reinforced by the front reinforcement 42.

When a front surface of the traveling electric vehicle collides with the three-dimensional obstacle E in a full-wrap frontal collision, the impact load at this time is transmitted to the left and right crash boxes 26 via the bumper beam 27 provided laterally in the vehicle width direction. As described above, the rigidities of the crash box 26, the front truss structural body, and the rear truss structural body are set to the crash box 26<the front truss structural body<the rear truss structural body.

Figure 6A:
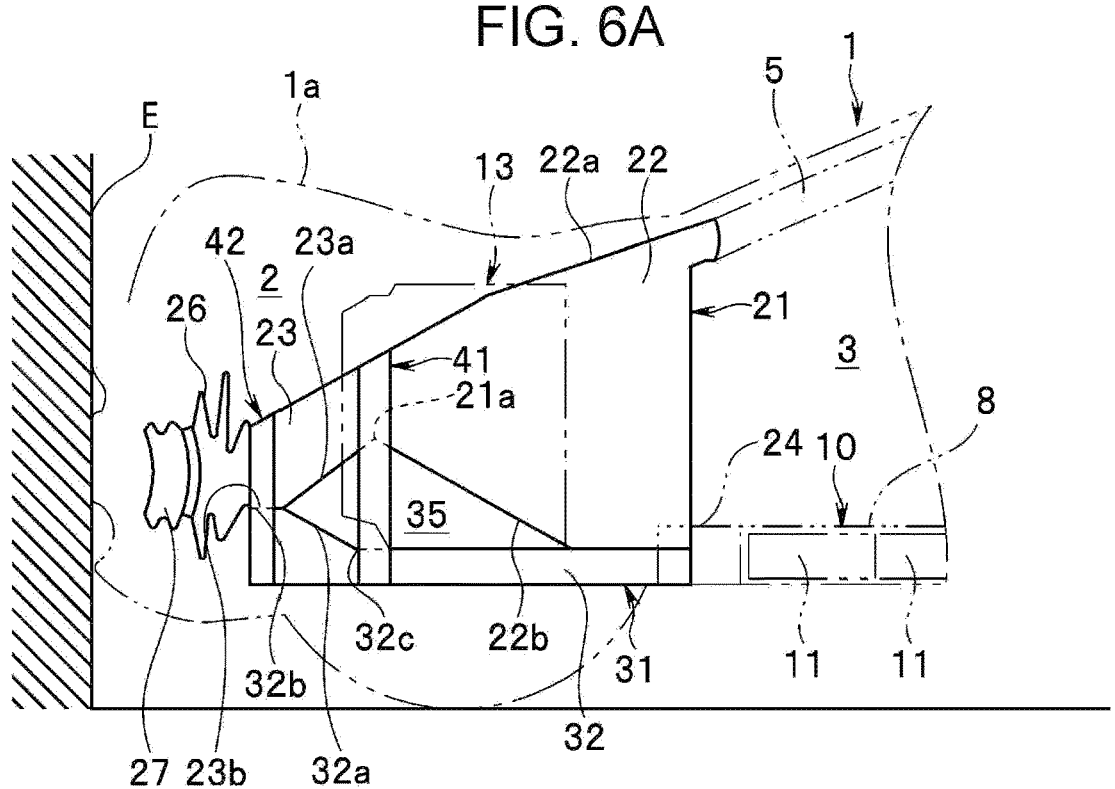
FIG. 6A is a side view illustrating a behavior of a front frame in an initial stage of a full-wrap frontal collision.

The coupling between the distal end portion of the front side frame 21 and the distal end portion of the lower side frame 32 is reinforced by the front reinforcement 42. Thus, even when the impact load is transmitted to the front side frame 21, the distal end portion of the front side frame 21 and the distal end portion of the lower side frame 32 are not separated from each other in the initial stage of the collision, and a drag is generated with respect to the crash box 26. As a result, as illustrated in FIG. 6A, in the initial stage of the collision, the bumper beam 27 is pressure-deformed, and the crash box 26 is axially crushed to absorb the impact energy.

Figure 6B:
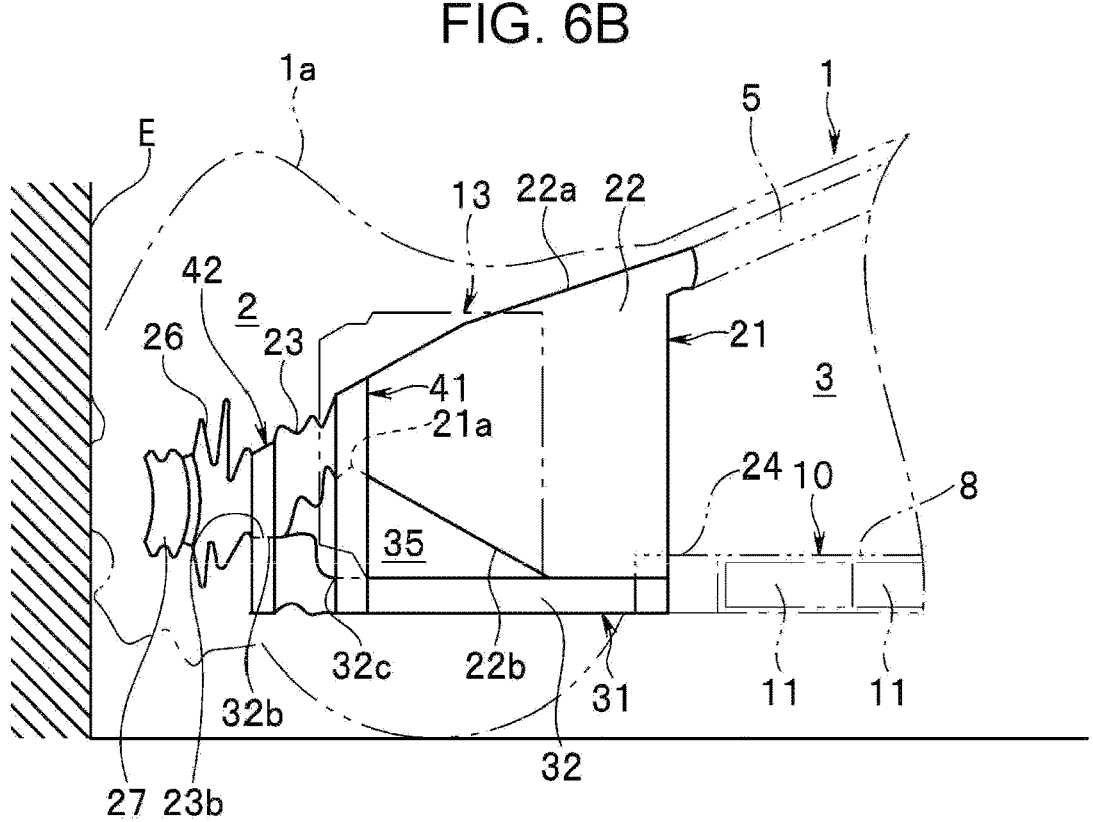
FIG. 6B is a side view illustrating a behavior of the front frame in a middle stage of the full-wrap frontal collision.

Subsequently, in a middle stage of the collision, as illustrated in FIG. 6B, the rear truss structural body serves as a drag, and the arm-shaped portion 23 forming the front truss structural body is axially crushed to absorb the impact energy. At this time, the arm-shaped portion 23 can be axially crushed because the portion from the rear end of the arm-shaped portion 23 to the wall-shaped portion 22 with the upper valley line portion 21a serving as the boundary is reinforced by the rear reinforcement 41.

In contrast, the lower valley line portion 32c formed in the lower side frame 32 of the cradle 31 is formed immediately in front of the front edge of the rear reinforcement 41. Accordingly, when the impact load is applied to the front truss structural body, the lower side frame 32 buckles in a direction in which the lower valley line portion 32c does not hinder the axial crushing of the arm-shaped portion 23. Thus, the arm-shaped portion 23 can be axially crushed efficiently.

Figure 6C:
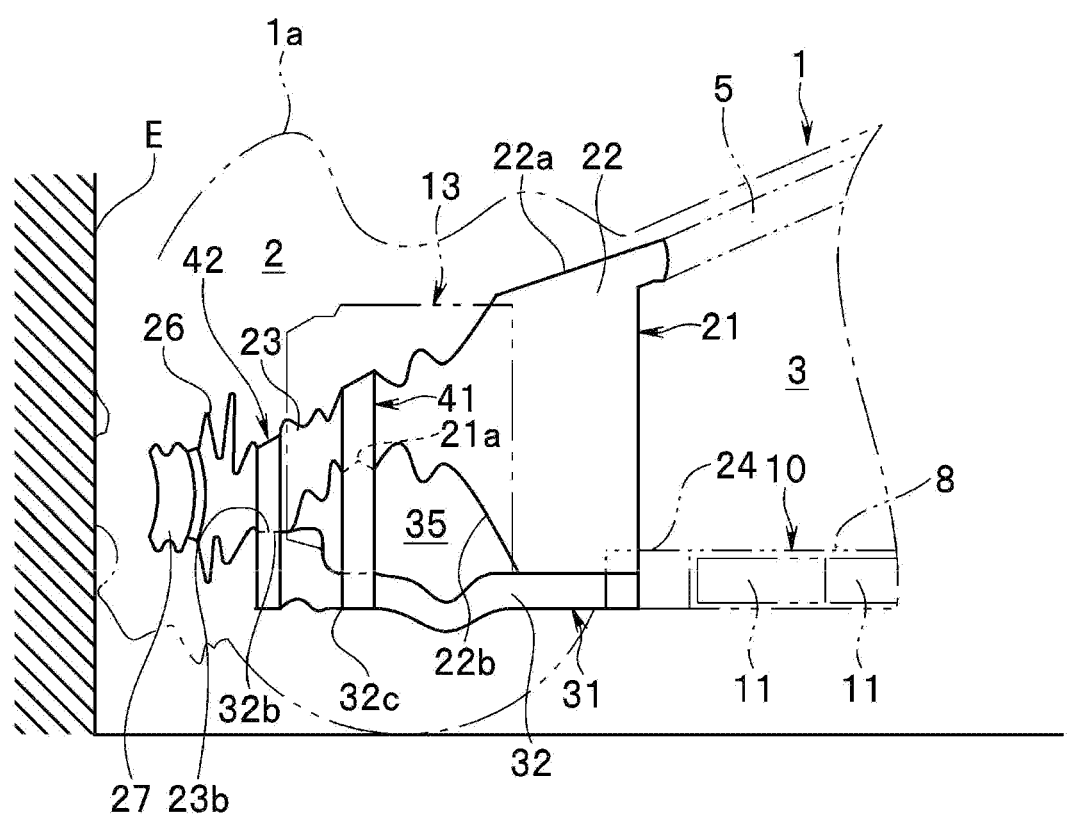
FIG. 6C is a side view illustrating a behavior of the front frame in a final stage of the full-wrap frontal collision.

As illustrated in FIG. 6C, in a final stage of the collision in which the front truss structural body is completely crushed, the first inclined surface portion 22b of the wall-shaped portion 22 forming the rear truss structural body is slightly axially crushed by receiving the drag of the front truss structural body. As a result, as illustrated in FIG. 6C, the impact energy is absorbed by the crushing of the region corresponding to the crush stroke set between the front portion of the power control unit 13 supported by the rear cross member 34 and the distal end portion of the front side frame 21. Thus, it is possible to effectively protect the power control unit 13 or the cabin 3, and the battery chamber 10 from the impact in the event of the frontal collision.

Since the upper panel 22a weld-joined to the front pillar 5 is weld-joined to the upper surface of the suspension tower 7b, the suspension tower 7b firmly holds the upper portion of the suspension even in the event of the frontal collision.

In the front frame structure according to the present embodiment, the front side frames 21 are reconstructed by utilizing the left and right extra spaces in the motor room 2 based on the front frame structure that is used in the vehicle in which the conventional reciprocating engine is mounted.

As a result, it is easy to design a structure for absorbing the impact energy stepwise in the extra spaces, and it is possible to ensure the crush stroke without damage on the power control unit 13 in a volume equivalent to that of the conventional engine room. Since the crush stroke can be ensured with the volume equivalent to that of the engine room of the vehicle in which the conventional reciprocating engine is mounted, the design is not impaired.

The disclosure is not limited to the above-described embodiment. For example, the axial crushing of the wall-shaped portion 22 may be controlled by breaking the rear reinforcement 41 in the final stage of the collision.

According to the embodiment of the disclosure, since the front side frames are disposed in the extra spaces formed between the side walls in the vehicle width direction of the motor room and the side surfaces of the power control unit based on the front frame structure that is used in the vehicle in which the conventional reciprocating engine is mounted, the framework of the front frame structure can be easily reconstructed. As a result, it is possible to design a structure capable of absorbing impact energy stepwise in an event of a frontal collision, and a crush stroke can be ensured without damage on the power control unit.

As a result, it is possible to effectively protect the control unit, and the cabin or the battery chamber from the impact in the event of the frontal collision without impairing the design.

The invention claimed is:

1. A front frame structure for an electric vehicle, the front frame structure comprising:
    front side frames in a pair, the front side frames extending in a front-rear direction of a vehicle body of the electric vehicle and being disposed respectively on both sides in a vehicle width direction of a motor room provided in a front portion of the vehicle body;
    a bumper beam coupling respective front ends of the front side frames; and
    a lower frame disposed in a lower portion of the motor room, both sides in the vehicle width direction of the lower frame being supported by the front side frames respectively,
    wherein a power control unit comprising an electric motor is supported on a rear portion of the lower frame,
    wherein the front side frames are disposed respectively in extra spaces that are each defined with a side wall in the vehicle width direction of the motor room and a side surface of the power control unit,
    wherein the front side frames each comprise
        a wall-shaped portion having a wall shape with a dimension in a height direction from a bottom portion of the motor room to an upper portion of the motor room, the wall-shaped portion extending within a rear region of the motor room, and
        an arm-shaped portion extending from a front end portion of the wall-shaped portion toward a front portion of the motor room,
    wherein a first inclined surface portion having a predetermined elevation angle is formed in a lower portion of the wall-shaped portion to extend forward from a rear portion of the wall-shaped portion,
    wherein a second inclined surface portion having a predetermined depression angle is formed on a bottom surface of the arm-shaped portion to extend forward from an end portion of the first inclined surface portion,
    wherein lower side frames provided respectively on a left and a right of the lower frame are joined to lower portions of the front side frames,
    wherein a front end portion of each of the front side frames and a front end portion of a corresponding one of the lower side frames are joined while being reinforced via a front reinforcement, and
    wherein a side surface of an upper valley line portion where the first inclined surface portion and the second inclined surface portion are joined to each other and a side surface of the corresponding one of the lower side frames facing a lower side of the upper valley line portion are coupled to each other via a rear reinforcement of the vehicle body.

2. The front frame structure for the electric vehicle according to claim 1,
    wherein an upper panel is provided on an upper surface of the wall-shaped portion, and
    wherein a rear end of the upper panel is joined to a front pillar provided in the vehicle body.

3. The front frame structure for the electric vehicle according to claim 2,
  wherein the upper panel is joined to an upper surface of a suspension tower of the vehicle body.

4. The front frame structure for the electric vehicle according to claim 3,
  wherein each of the front reinforcement and the rear reinforcement is formed by bending a plate member into a groove shape.

5. The front frame structure for the electric vehicle according to claim 2,
  wherein each of the front reinforcement and the rear reinforcement is formed by bending a plate member into a groove shape.

6. The front frame structure for the electric vehicle according to claim 1,
  wherein a third inclined surface portion having a predetermined elevation angle is formed from a rear portion of the vehicle body to the front portion of the vehicle body on a distal end side of each of the lower side frames.

7. The front frame structure for the electric vehicle according to claim 6,
  wherein each of the front reinforcement and the rear reinforcement is formed by bending a plate member into a groove shape.

8. The front frame structure for the electric vehicle according to claim 1,
  wherein each of the front reinforcement and the rear reinforcement is formed by bending a plate member into a groove shape.

\* \* \* \* \*